US012125454B2

(12) United States Patent
Wu et al.

(10) Patent No.: US 12,125,454 B2
(45) Date of Patent: Oct. 22, 2024

(54) DISPLAY PANEL AND DISPLAY DEVICE

(71) Applicant: Xiamen Tianma Microelectronics Co., Ltd., Xiamen (CN)

(72) Inventors: Hao Wu, Xiamen (CN); Yiqiang Lin, Xiamen (CN)

(73) Assignee: Xiamen Tianma Microelectronics Co., Ltd., Xiamen (CN)

( * ) Notice: Subject to any disclaimer, the term of this patent is extended or adjusted under 35 U.S.C. 154(b) by 0 days.

(21) Appl. No.: 18/378,792

(22) Filed: Oct. 11, 2023

(65) Prior Publication Data

US 2024/0038192 A1 Feb. 1, 2024

(30) Foreign Application Priority Data

Mar. 27, 2023 (CN) ........................ 202310307730.5

(51) Int. Cl.
*G09G 3/36* (2006.01)

(52) U.S. Cl.
CPC ......... *G09G 3/3614* (2013.01); *G09G 3/3648* (2013.01); *G09G 2300/0452* (2013.01); *G09G 2310/0262* (2013.01); *G09G 2310/0297* (2013.01); *G09G 2320/0257* (2013.01)

(58) Field of Classification Search
CPC ............... G09G 3/3648; G09G 3/3614; G09G 2320/0219; G09G 2310/0297; G09G 2320/0223; G09G 2300/0452; G09G 2320/0257; G09G 2310/0262
See application file for complete search history.

(56) References Cited

U.S. PATENT DOCUMENTS

| | | | | |
|---|---|---|---|---|
| 7,808,472 B2 * | 10/2010 | Park | G09G 3/3614 345/98 |
| 10,262,607 B2 * | 4/2019 | Ma | G09G 3/3677 |
| 10,297,214 B2 * | 5/2019 | Lin | G09G 3/3648 |
| 10,388,236 B2 * | 8/2019 | Noguchi | G09G 3/3614 |
| 10,559,271 B2 * | 2/2020 | Noguchi | G09G 3/3614 |
| 10,930,235 B2 * | 2/2021 | Kang | G09G 3/3607 |
| 11,183,130 B2 * | 11/2021 | He | G09G 3/20 |
| 11,600,233 B2 * | 3/2023 | Wang | G09G 3/3266 |
| 11,749,147 B2 * | 9/2023 | Lee | G06F 3/04166 345/173 |

(Continued)

FOREIGN PATENT DOCUMENTS

| | | |
|---|---|---|
| CN | 106205527 | 12/2016 |
| CN | 111474783 A | 7/2020 |

*Primary Examiner* — Vinh T Lam
(74) *Attorney, Agent, or Firm* — KDW Firm PLLC

(57) ABSTRACT

In the display panel, a display region includes a plurality of sub-pixels arranged in an array, and a non-display region includes a plurality of demultiplexers, a plurality of signal source lines and M timing control lines. Each of the plurality of demultiplexers includes N gating switches, where in the same demultiplexer, input terminals of a plurality of gating switches are electrically connected to the same signal source line, an output terminal of each of the plurality of gating switches is electrically connected to one column of sub-pixels, and control terminals of the plurality of gating switches are electrically connected to different timing control lines. data signals transmitted by at least two signal source lines electrically connected to at least two gating switches controlled by a timing control line have opposite voltage polarities.

20 Claims, 9 Drawing Sheets

(56) References Cited

U.S. PATENT DOCUMENTS

| | | | | |
|---|---|---|---|---|
| 11,756,495 | B2 * | 9/2023 | Zhang | G09G 3/3614<br>345/690 |
| 11,783,793 | B1 * | 10/2023 | Lin | G09G 3/36<br>345/214 |
| 11,798,509 | B2 * | 10/2023 | Ichikura | G02F 1/133 |
| 11,935,465 | B2 * | 3/2024 | Roh | G09G 3/3208 |
| 11,984,081 | B2 * | 5/2024 | Yang | G09G 3/3266 |
| 2015/0161927 | A1 * | 6/2015 | Hekstra | G09G 3/3614<br>345/209 |
| 2019/0318700 | A1 * | 10/2019 | Iwase | G09G 3/3648 |
| 2023/0368742 | A1 * | 11/2023 | Lee | G09G 3/3233 |

* cited by examiner

DISPLAY PANEL AND DISPLAY DEVICE

CROSS-REFERENCE TO RELATED APPLICATION

This application claims priority to Chinese Patent Application No. 202310307730.5 filed Mar. 27, 2023, the disclosure of which is incorporated herein by reference in its entirety.

TECHNICAL FIELD

The present disclosure relates to the field of display technology and, for example, to a display panel and a display device.

BACKGROUND

With the rapid development of display technology, people have increasingly higher requirements for the quality of a display panel. A display drive chip for controlling display is disposed in a non-display region of a display device and provides a data signal to a data line to charge sub-pixels for display. For a small-sized display panel, in the case of limited space, a display drive chip mainly provides a data signal to a data line through a multi-path selection circuit, and a signal source line connected to a signal output port of the display drive chip can provide data signals to a plurality of data lines in a time-division manner, thereby charging connected sub-pixels.

However, sub-pixels in an existing display panel may have delayed charging or imbalanced charging, which may cause the display of vertical stripes in a severe case, thereby affecting a display effect of the display panel.

SUMMARY

The present disclosure provides a display panel and a display device to avoid the delayed charging of some sub-pixels, ensure the balanced charging of sub-pixels in the display panel and improve a display effect of the display panel.

In a first aspect, embodiments of the present disclosure provide a display panel. The display panel includes a display region and a non-display region located on one side of the display region, where the display region includes a plurality of sub-pixels arranged in an array, and the non-display region includes a plurality of demultiplexers, a plurality of signal source lines and M timing control lines, where M is an integer greater than 1.

Each of the plurality of demultiplexers includes N gating switches, where in the same demultiplexer, input terminals of the N gating switches are electrically connected to the same signal source line, an output terminal of each of the plurality of gating switches is electrically connected to one column of sub-pixels of the plurality of sub-pixels, and control terminals of the plurality of gating switches are electrically connected to different timing control lines, where M=K*N, and each of K and N is an integer greater than 1.

At a display stage, N timing control lines electrically connected to the same demultiplexer are configured to output timing control signals in a time-division manner to control the N gating switches of the same demultiplexer to turn on according to the timing control signals; wherein, the M timing control lines include at least one first timing control line, and when gating switches controlled by any one of the at least one first timing control line are turned on, data signals transmitted by at least two signal source lines electrically connected to at least two of the gating switches controlled by any one of the at least one first timing control line have opposite voltage polarities.

In a second aspect, embodiments of the present disclosure provide a display device. The display device includes the display panel in the first aspect.

It is to be understood that the content described in this section is neither intended to identify key or critical features of embodiments of the present disclosure nor intended to limit the scope of the present disclosure. Other features of the present disclosure become easily understood through the description hereinafter.

DETAILED DESCRIPTION

In order that the objects, technical solutions, and advantages of the present disclosure are clearer, the technical solutions of the present disclosure are described more clearly and completely hereinafter with reference to drawings of embodiments of the present disclosure and in conjunction with implementations. Apparently, the embodiments described herein are some embodiments, not all embodiments, of the present disclosure. All other embodiments obtained by those skilled in the art based on the basic concepts disclosed and indicated in embodiments of the present disclosure are within the scope of the present disclosure.

Figure 1:
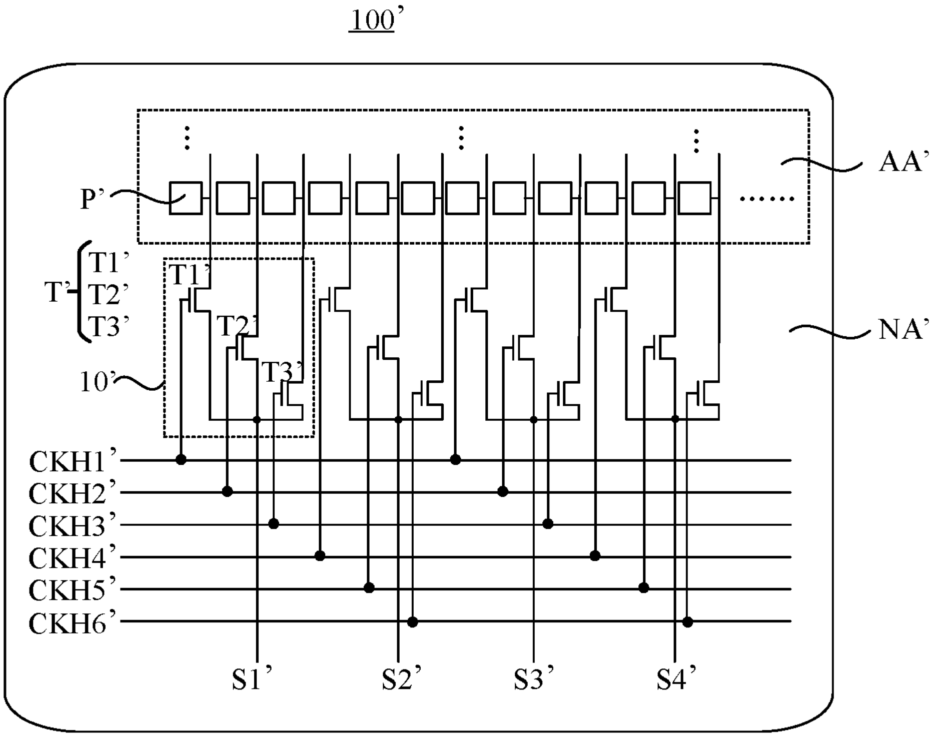
(Prior Art) FIG. 1
FIG. 1 is a partial structural diagram of a display panel in the related art.

As described in BACKGROUND, FIG. 1 is a partial structural diagram of a display panel in the related art. As shown in FIG. 1, a display region AA' of the display panel 100' includes a plurality of sub-pixels P' arranged in an array, and a non-display region NA' of the display panel 100' includes a plurality of demultiplexers 10', where each of the plurality of demultiplexers 10' includes a plurality of gating switches T', for example, the each of the plurality of demultiplexers 10' includes three gating switches T', which are T1', T2' and T3', respectively. Input terminals of T1', T2' and T3' in the same demultiplexer 10' are electrically connected to the same signal source line S' (for example, the signal source line S' includes S1', S2', S3' and S4'), and control terminals of the plurality of gating switches T' are electrically connected to different timing control lines CKH'. To reduce the number of gating switches T' electrically connected to each timing control line CKH', two groups of timing control lines CKH' are generally disposed. For example, the two groups of timing control lines CKH' include CKH1' to CKH6'. Gating switches T1', T2' and T3' of a demultiplexer 10' at an odd-numbered position are electrically connected to a first group of timing control lines CKH1', CKH2' and CKH3' in one-to-one correspondence, and gating switches T1', T2' and T3' of a demultiplexer 10' at an even-numbered position are electrically connected to a second group of timing control lines CKH4', CKH5' and CKH6' in one-to-one correspondence. An output terminal of each gating switch T' is electrically connected to one column of sub-pixels P'. In this manner, when an effective timing control signal provided by a timing control line CKH' controls a gating switch T' to turn on, a signal source line S' electrically connected to the gating switch T' provides a data signal to sub-pixels P', thereby charging the sub-pixels P'.

Figure 2:
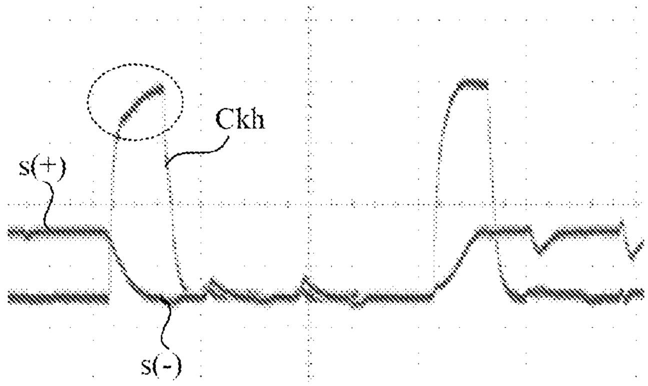
(Prior Art) FIG. 2
FIG. 2 is a drive timing diagram of FIG. 1.

However, the inventors have found that since a parasitic capacitance (not shown) is between a control terminal and an input terminal of the gating switch T', a coupling impact is caused between the timing control signal transmitted by the timing control line CKH' and the data signal transmitted by the signal source line S'. Moreover, data signals provided by adjacent signal source lines S' in the related art illustrated in FIG. 1 have opposite voltage polarities. A voltage of a data signal provided by a signal source line S' electrically connected to the demultiplexer 10' at the odd-numbered position is of positive polarity, and a voltage of a data signal provided by a signal source line S' electrically connected to the demultiplexer 10' at the even-numbered position is of negative polarity, so that polarities of data signals transmitted by signal source lines S' electrically connected to corresponding gating switches T' controlled by each timing control line CKH' are the same. In this manner, under the coupling impact between the timing control line CKH' and the signal source line S', the data signal provided by the signal source line S' will have a coupling effect on the effective timing control signal provided by the timing control line CKH' so that the effective timing control signal Ckh is pulled down or raised up, thereby affecting the normal charging of the sub-pixels P' and causing abnormal or imbalanced charging. FIG. 2 is a drive timing diagram of FIG. 1. Referring to FIGS. 1 and 2, the effective timing control signal Ckh provided by the timing control line CKH' is a high-level signal. In this case, the timing control signal Ckh controls the gating switch T' to turn on so that the data signal s provided by the signal source line S' is transmitted to the sub-pixels P' through the gating switch T'. When the data signal provided by the signal source line S' is a negative polarity signal (s(−)), the timing control signal Ckh is pulled down due to the coupling effect so that a very long process is required for the timing control signal Ckh to hop from a low level to a high level (reference is made to a position circled by a dash line in FIG. 2), thus the time that the timing control signal Ckh reaches a stable high level is delayed, and the duration of maintaining the timing control signal Ckh at the stable high level is reduced, and thus the time that the gating switch T' is turned on is delayed and the charging duration is shortened. However, when the data signal s provided by the signal source line S' is a positive polarity signal (s(+)), the timing control signal Ckh is raised up due to the coupling effect so that the timing control signal Ckh can quickly hop from a low level to a high level, thereby ensuring that the timing control signal Ckh is quickly maintained at a stable high level. In this manner, some sub-pixels P' in the display region AA' have delayed charging so that the sub-pixels P' have imbalanced charging, thereby causing the display of vertical stripes on the display panel and affecting a display effect of the display panel.

Based on the above technical problems, the embodiments of the present disclosure provide a display panel. The display panel includes a display region and a non-display region located on one side of the display region, where the display region includes a plurality of sub-pixels arranged in an array, and the non-display region includes a plurality of demultiplexers, a plurality of signal source lines and M timing control lines, where M is an integer greater than 1. Each of the plurality of demultiplexers includes N gating switches, where in the same demultiplexer, input terminals of a plurality of gating switches are electrically connected to the same signal source line, an output terminal of each of the plurality of gating switches is electrically connected to one column of sub-pixels, and control terminals of the plurality of gating switches are electrically connected to different timing control lines, where M=K*N, and each of K and N is an integer greater than 1. At a display stage, N timing control lines electrically connected to the same demultiplexer are used for outputting timing control signals (for example, the timing control signals may be effective timing control signals) in a time-division manner to control the N gating switches of the same demultiplexer to turn on in the time-division manner; where the M timing control lines comprise at least one timing control line, when gating switches controlled by any one of the at least one timing control line are turned on, data signals transmitted by at least two signal source lines electrically connected to at least two gating switches controlled by any one of the at least one timing control line have opposite voltage polarities.

With the use of the above technical solution, the display region includes the plurality of sub-pixels arranged in the array, and the non-display region includes the plurality of demultiplexers, the plurality of signal source lines and the M timing control lines, where M is the integer greater than 1; the each of the plurality of demultiplexers includes the N gating switches, where in the same demultiplexer, the input terminals of the plurality of gating switches are electrically connected to the same signal source line, the output terminal of the each of the plurality of gating switches is electrically connected to the one column of sub-pixels, and the control terminals of the plurality of gating switches are electrically connected to the different timing control lines, where M=K*N, and each of K and N is the integer greater than 1, thereby reducing the number of gating switches electrically connected to each timing control line and avoiding the delayed charging and imbalanced charging of the sub-pixels caused by too large a load of the timing control line. At the display stage, the N timing control lines electrically connected to the same demultiplexer output the effective timing control signals in the time-division manner to control the N gating switches of the demultiplexer to turn on in the time-division manner, which is conducive to reducing the number of signal source lines, thereby reducing the number of data signal pins in a driver chip and reducing a cost of the display panel where the driver chip is used for driving. The N timing control lines comprise at least one timing control line, and when the gating switches controlled by any one of the at least one timing control line are turned on, the data signals transmitted by the at least two signal source lines electrically connected to the at least two gating switches controlled by the any one of the at least one timing control line have the opposite voltage polarities, so that coupling impacts of the data signals having the opposite voltage polarities on a timing control signal can be mutually canceled, thereby ensuring that the effective timing control signal transmitted by the timing control line can be quickly maintained at a stable effective level, avoiding the delayed charging of some sub-pixels, ensuring the balanced charging of the sub-pixels in the display region and improving a display effect of the display panel.

Technical solutions in the embodiments of the present disclosure are described clearly and completely below in conjunction with the drawings in the embodiments of the present disclosure. Apparently, the embodiments described herein are some embodiments, not all embodiments, of the present disclosure. Based on the embodiments of the present disclosure, all other embodiments obtained by those of ordinary skill in the art on the premise that no creative work is done are within the scope of the present disclosure.

Figure 3:
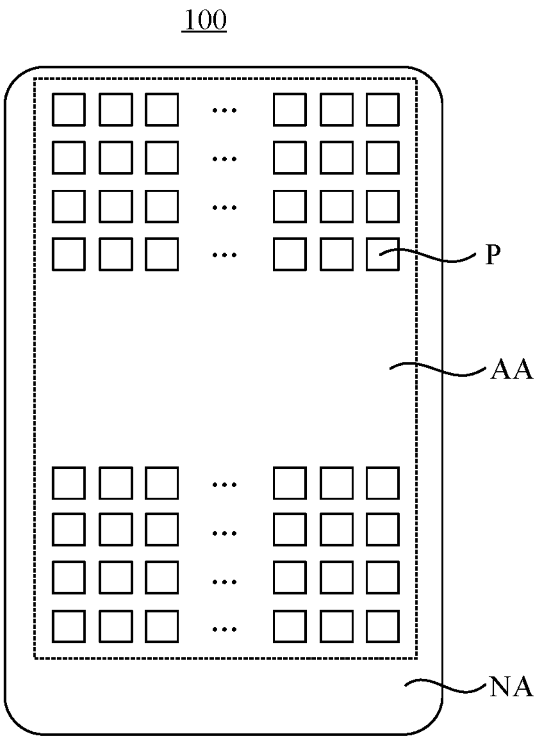
FIG. 3 is a structural diagram of a display panel according to an embodiment of the present disclosure.
Figure 4:
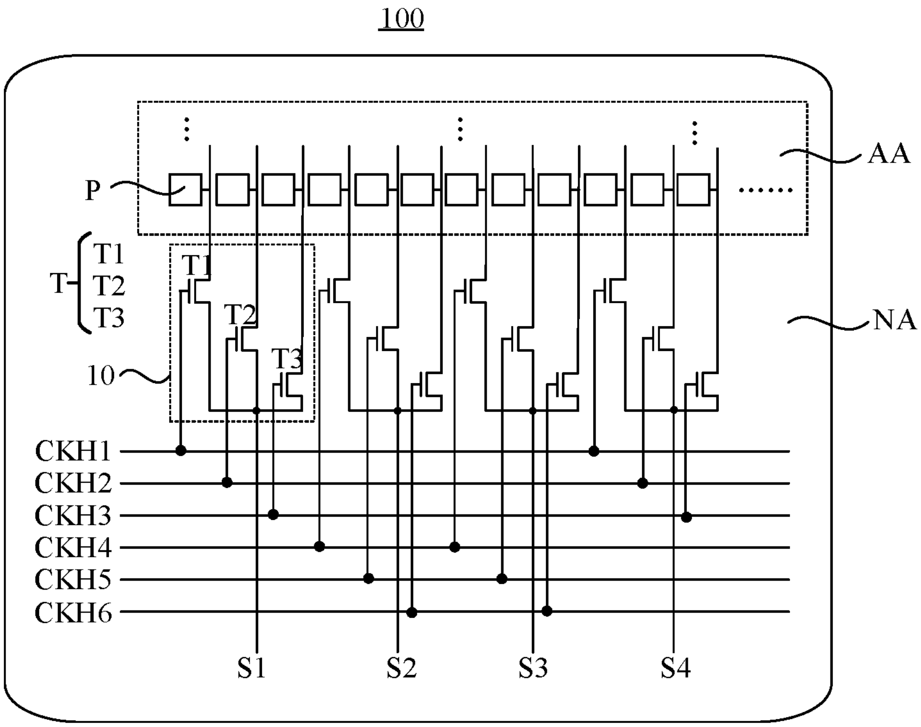
FIG. 4 is a partial structural diagram of a display panel according to an embodiment of the present disclosure.

FIG. 3 is a structural diagram of a display panel according to an embodiment of the present disclosure, and FIG. 4 is a partial structural diagram of a display panel according to an embodiment of the present disclosure. As shown in FIGS. 3 and 4, the display panel 100 includes a display region AA and a non-display region NA located on one side of the display region AA, where the display region AA includes a plurality of sub-pixels P arranged in an array, and the non-display region NA includes a plurality of demultiplexers 10, a plurality of signal source lines S and M timing control lines CKH, where M is an integer greater than 1. Each of the plurality of demultiplexers 10 includes N gating switches T, where in the same demultiplexer 10, input terminals of a plurality of gating switches T are electrically connected to the same signal source line S, an output terminal of each of the plurality of gating switches T is electrically connected to one column of sub-pixels P, and control terminals of the plurality of gating switches T are electrically connected to different timing control lines CKH, where M=K*N, and each of K and N is an integer greater than 1. At a display stage, N timing control lines CKH electrically connected to the same demultiplexer 10 are used for outputting effective timing control signals Ckh in a time-division manner to control N gating switches T of the demultiplexer 10 to turn on in the time-division manner; at least one timing control line CKH exists, and when gating switches T controlled by the timing control line CKH are turned on, data signals transmitted by at least two signal source lines S electrically connected to at least two gating switches T controlled by the timing control line CKH have opposite voltage polarities.

Among the plurality of sub-pixels P arranged in the array in the display region AA, all columns of sub-pixels P may have the same color or different colors, which is not specifically limited here. The sub-pixel P may be a red sub-pixel (R), a green sub-pixel (G), a blue sub-pixel (B), a white sub-pixel (W) or a yellow sub-pixel (Y), which is not specifically limited in the present disclosure. An arrangement of the sub-pixels P in the display region AA is not limited to an array arrangement and may also be another arrangement, for example, a delta arrangement, which is not specifically limited in the present disclosure.

The number N of gating switches T in the demultiplexer 10 may be any integer value greater than or equal to 2, which is not specifically limited here. According to different values of K, the number M of corresponding timing control lines CKH also has different values. Since K is the integer greater than 1, a minimum value of K is 2. In other words, the number M of timing control lines CKH is at least twice the number N of gating switches T in the demultiplexer 10. Compared with the case where the number of timing control lines CKH is the same as the number of gating switches T in the demultiplexer 10, that is, K=1, in the display panel 100 of the present embodiment, K is the integer greater than 1, thereby reducing the number of gating switches T electrically connected to each timing control line CKH and avoiding the delayed charging and imbalanced charging of the sub-pixels P caused by too large a load of the timing control line CKH.

It is to be noted that a value of K may be set according to an actual requirement, which is not specifically limited in the present embodiment. For ease of a detailed description of the solution, unless otherwise specified, K=2 is used as an example in each of the following embodiments for an exemplary description.

In some embodiments, a value of the number N of gating switches T in the demultiplexer 10 may be N=2 or N=3 or N=6, but it is not limited thereto. Only N=3 is exemplarily illustrated in FIG. 4.

Figure 5:
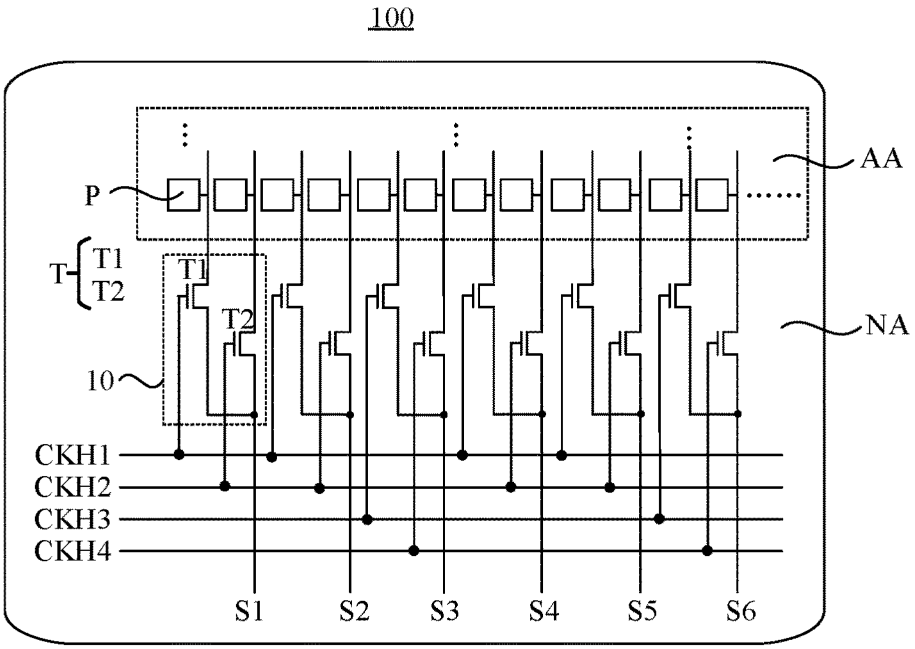
FIG. 5 is a partial structural diagram of another display panel according to an embodiment of the present disclosure.
Figure 6:
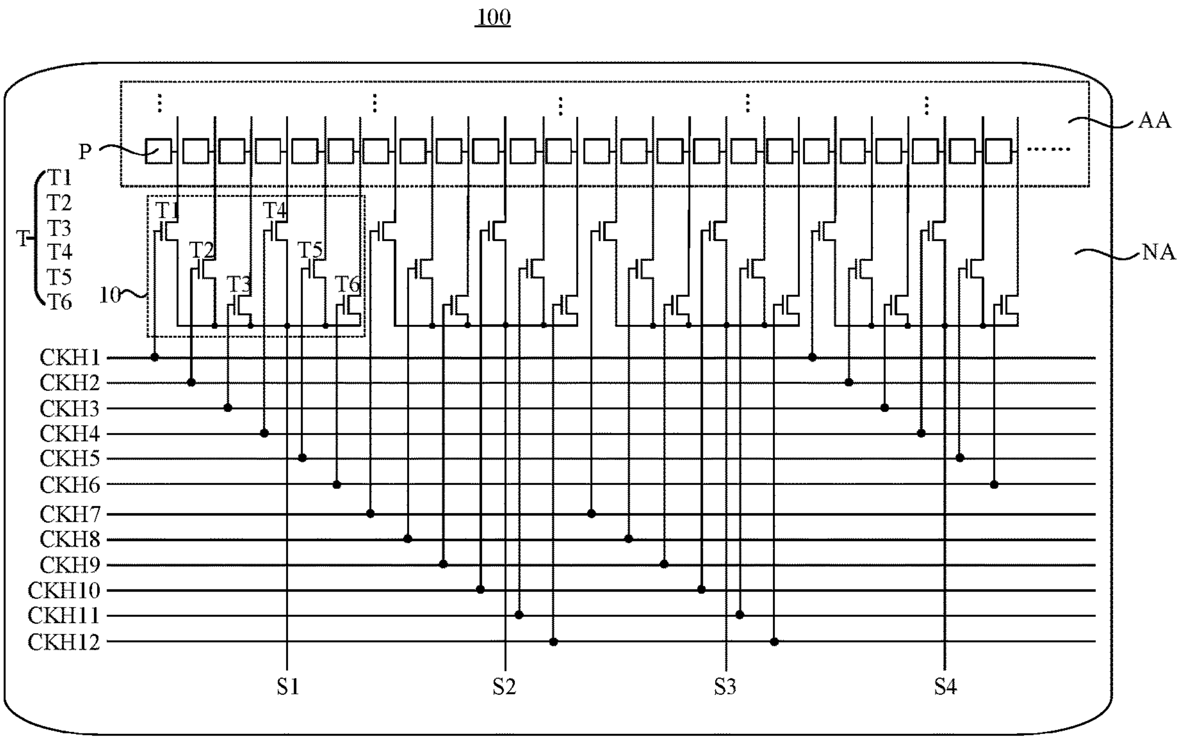
FIG. 6 is a partial structural diagram of another display panel according to an embodiment of the present disclosure.

In other embodiments, FIG. 5 is a partial structural diagram of another display panel according to an embodiment of the present disclosure, and FIG. 6 is a partial structural diagram of another display panel according to an embodiment of the present disclosure. Referring to FIGS. 5 and 6, a schematic diagram of a connection structure in the case of N=2 is exemplarily illustrated in FIG. 5, and a schematic diagram of a connection structure in the case of N=6 is exemplarily illustrated in FIG. 6, but it is not limited thereto.

For ease of a detailed description of the solution, unless otherwise specified, N=3 is used as an example in each of the following embodiments for an exemplary description.

In some embodiments, the gating switch T includes an N-channel thin film transistor. It is to be understood that in the case where the gating switch T is an N-channel thin film transistor, when the effective timing control signal Ckh output by the timing control line CKH is at a high level, the gating switch T can be controlled to turn on, and when the effective timing control signal Ckh output by the timing control line CKH is at a low level, the gating switch T can be controlled to turn off. The gating switch T may also be a P-channel thin film transistor. When the effective timing control signal Ckh output by the timing control line CKH is at a low level, the gating switch T can be controlled to turn on, and when the effective timing control signal Ckh output by the timing control line CKH is at a high level, the gating switch T can be controlled to turn off. A specific type of the gating switch T may be set according to an actual requirement, which is not specifically limited here. For ease of a detailed description of the solution, unless otherwise specified, that the gating switch T is an N-channel thin film transistor is used as an example in each of the following embodiments for description.

With continued reference to FIGS. 4 to 6, it is to be understood that output terminals of the gating switches T (for example, T1, T2 and T3) in a demultiplexer 10 are electrically connected to different columns of sub-pixels P through different data lines, and at a display stage of the display panel 100, N timing control lines CKH electrically connected to the same demultiplexer 10 output effective timing control signals Ckh in a time-division manner to control N gating switches T of the demultiplexer 10 to turn on in a time-division manner so that a data signal transmitted by a signal source line S can be transmitted to sub-pixels P through data lines when the gating switches T are turned on, thereby charging the sub-pixels P. Since each signal source line S is electrically connected to N data signal lines through a demultiplexer compared with the case where one signal source line S corresponds to one data signal line, it is conducive to reducing the number of signal source lines S, thereby reducing the number of data signal pins in a driver chip and reducing a cost of the display panel 100 where the driver chip is used for driving.

With continued reference to FIGS. 4 to 6, at least one timing control line CKH exists, and when gating switches T controlled by the timing control line CKH are turned on, data signals transmitted by at least two signal source lines S electrically connected to at least two gating switches T controlled by the timing control line CKH have opposite voltage polarities. That an effective timing control signal Ckh transmitted by the timing control line CKH is at a high level is used as an example. In this case, a negative polarity data signal pulls down the effective timing control signal Ckh, and a positive polarity data signal raises up the effective timing control signal Ckh, so that coupling impacts of the data signals having the opposite voltage polarities on the timing control signal Ckh can be mutually canceled, thereby ensuring that the effective timing control signal Ckh transmitted by the timing control line CKH can be quickly maintained at a stable effective level (for example, a high level). In this manner, waveforms of effective timing control signals Ckh received by the gating switches T are maintained to be the same, thereby avoiding the delayed charging of some sub-pixels P, ensuring the balanced charging of the sub-pixels P in the display region AA and improving the display effect of the display panel 100.

In some embodiments, with continued reference to FIGS. 4 to 6, an i-th timing control line CKHi and any (i+kN)-th timing control line CKH(i+kN) have the same timing control signal, where 1≤i≤N, 1≤k<K, and k is an integer.

In some embodiments, the number M of timing control lines CKH may be K multiples of the number N of gating switches T in a demultiplexer 10. According to different values of K, the timing control lines CKH may be divided into K groups, where a value of k satisfies 1≤k<K, and k is any integer within the value range.

For example, referring to FIG. 4, the number M of timing control lines CKH is 6, and the number N of gating switches T in the demultiplexer 10 is 3, that is, K=2. In this manner, the six timing control lines CKH are divided into two groups, and k=1. In this case, when i=1, i+kN=4, that is, a first timing control line CKH1 and a fourth timing control line CKH4 have the same timing control signal; when i=2, i+kN=5, that is, a second timing control line CKH2 and a fifth timing control line CKH5 have the same timing control signal; when i=3, i+kN=6, that is, a third timing control line CKH3 and a sixth timing control line CKH6 have the same timing control signal.

In some embodiments, with continued reference to FIGS. 4 to 6, data signals transmitted by two signal source lines S electrically connected to any two adjacent demultiplexers 10 have opposite voltage polarities; two adjacent demultiplexers 10 exist, and among N timing control lines CKH electrically connected to one of the two adjacent demultiplexers 10, at least one timing control line CKH is electrically connected to the other one of the two adjacent demultiplexers 10.

It is to be understood that the output terminals of the gating switches T in the demultiplexer 10 are electrically connected to the different columns of sub-pixels P through the different data lines so that the data signal transmitted by the signal source line S can be transmitted to the sub-pixels P through the data lines when the gating switches T are turned on, thereby charging the sub-pixels P. Data signals transmitted by any two adjacent signal source lines S have opposite voltage polarities so that impacts between data signals transmitted by two adjacent data signal lines can be mutually canceled, thereby improving the accuracy of data signals transmitted by the data signal lines to the sub-pixels P and improving the display effect of the display panel 100.

For example, as shown in FIG. 4, two adjacent demultiplexers 10 exist, which are a demultiplexer 10 electrically connected to a signal source line S2 and a demultiplexer 10 electrically connected to a signal source line S3, respectively, where the demultiplexer 10 electrically connected to the signal source line S2 is electrically connected to the fourth timing control line CKH4, the fifth timing control line CKH5 and the sixth timing control line CKH6, and each of CKH4 to CKH6 is electrically connected to the demultiplexer 10 electrically connected to the signal source line S3. In this manner, for any one of the fourth timing control line CKH4, the fifth timing control line CKH5 and the sixth timing control line CKH6, when gating switches T controlled by the timing control line CKH are turned on, data signals transmitted by at least two signal source lines S (the signal source line S2 and the signal source line S3) electrically connected to at least two gating switches T controlled by the timing control line CKH have opposite voltage polarities so that coupling impacts of the data signals transmitted by the signal source lines S on timing control signals Ckh (Ckh4, Ckh5 and Ckh6) can be mutually canceled, thereby ensuring that the effective timing control signals Ckh transmitted by the timing control lines CKH can be quickly maintained at stable effective levels (high levels), avoiding the delayed charging of some sub-pixels P, ensuring the balanced charging of the sub-pixels P in the display region AA and improving a display effect of the display panel 100.

Figure 7:
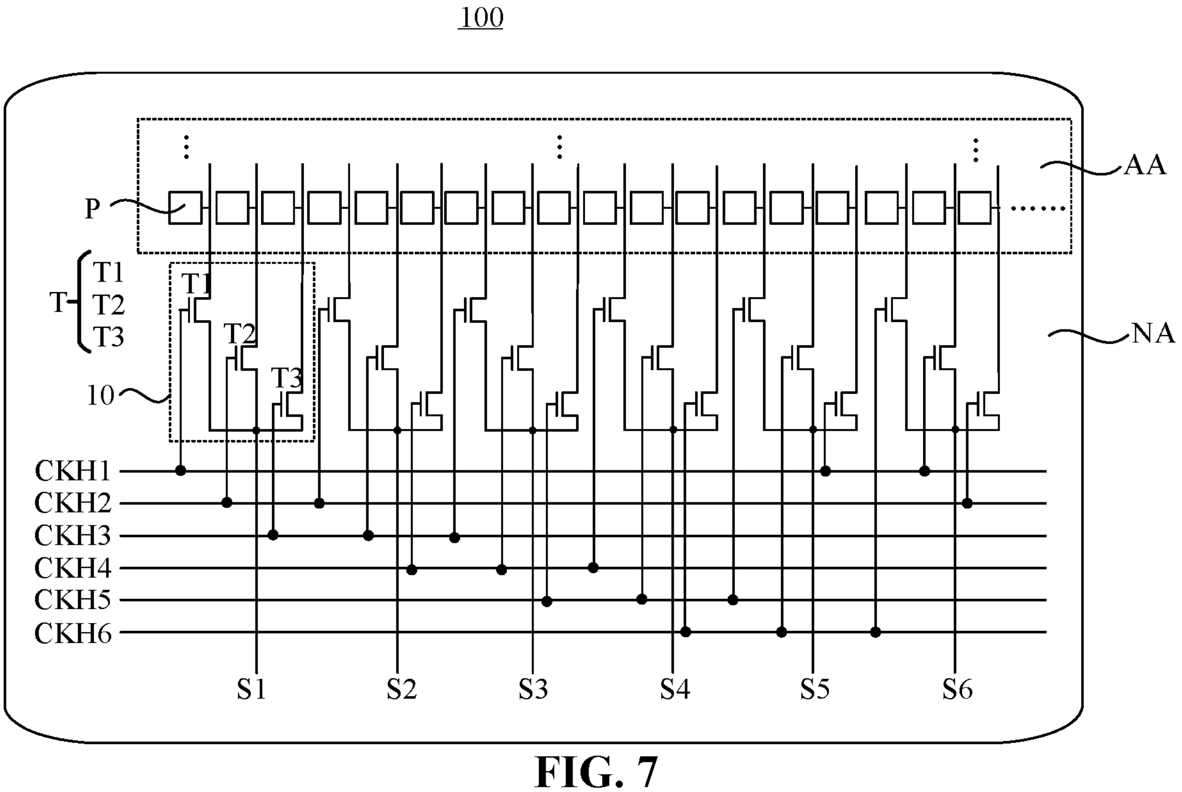
FIG. 7 is a partial structural diagram of another display panel according to an embodiment of the present disclosure.

In other embodiments, FIG. 7 is a partial structural diagram of another display panel according to an embodiment of the present disclosure. Referring to FIG. 7, two adjacent demultiplexers 10 exist, which are a demultiplexer 10 electrically connected to a signal source line S1 and a demultiplexer 10 electrically connected to a signal source line S2, respectively, where the demultiplexer 10 electrically connected to the signal source line S1 is electrically connected to a first timing control line CKH1, a second timing control line CKH2 and a third timing control line CKH3, and only the second timing control line CKH2 and the third timing control line CKH3 are electrically connected to the demultiplexer 10 electrically connected to the signal source line S2. In this manner, for any one of the second timing control line CKH2 and the third timing control line CKH3, when gating switches T controlled by the timing control line CKH are turned on, data signals transmitted by at least two signal source lines S (the signal source line S1 and the signal source line S2) electrically connected to at least two gating switches T controlled by the timing control line CKH have opposite voltage polarities so that coupling impacts of the data signals transmitted by the signal source lines S on timing control signals Ckh (Ckh2 and Ckh3) can be mutually canceled. With continued reference to FIG. 7, a demultiplexer 10 electrically connected to a signal source line S6 is electrically connected to the first timing control line CKH1, the second timing control line CKH2 and a sixth timing control line CKH6, and since the third timing control line CKH3 and the sixth timing control line CKH6 have the same timing control signal, that three gating switches T in the demultiplexer 10 are turned on in a time-division manner is not affected. Further, polarities of data signals transmitted by signal source lines S are spaced apart from each other. S1, S3 and S5 have the same polarity, and S2, S4 and S6 have the same polarity. In this case, when gating switches T controlled by the first timing control line CKH1 are turned on, data signals transmitted by at least two signal source lines S (the signal source line S1 and the signal source line S6) electrically connected to at least two gating switches T controlled by the first timing control line CKH1 have opposite voltage polarities so that coupling impacts of the data signals transmitted by the signal source lines S on a timing control signal Ckh1 can be mutually canceled. In this manner, a structure shown in FIG. 7 enables effective timing control signals Ckh transmitted by timing control lines CKH in the display panel 100 to be quickly maintained at stable effective levels (high levels), thereby avoiding the delayed charging of some sub-pixels P, ensuring the balanced charging of the sub-pixels P in a display region AA and improving a display effect of the display panel 100.

In some embodiments, with continued reference to FIG. 4, the N gating switches T of the demultiplexer 10 are divided into a first gating switch T1 to an N-th gating switch TN; for any one of the demultiplexers 10, a control terminal of an i-th gating switch Ti is electrically connected to an i-th timing control line CKHi, or a control terminal of an i-th gating switch Ti is electrically connected to an (i+kN)-th timing control line CKH(i+kN).

Figure 8:
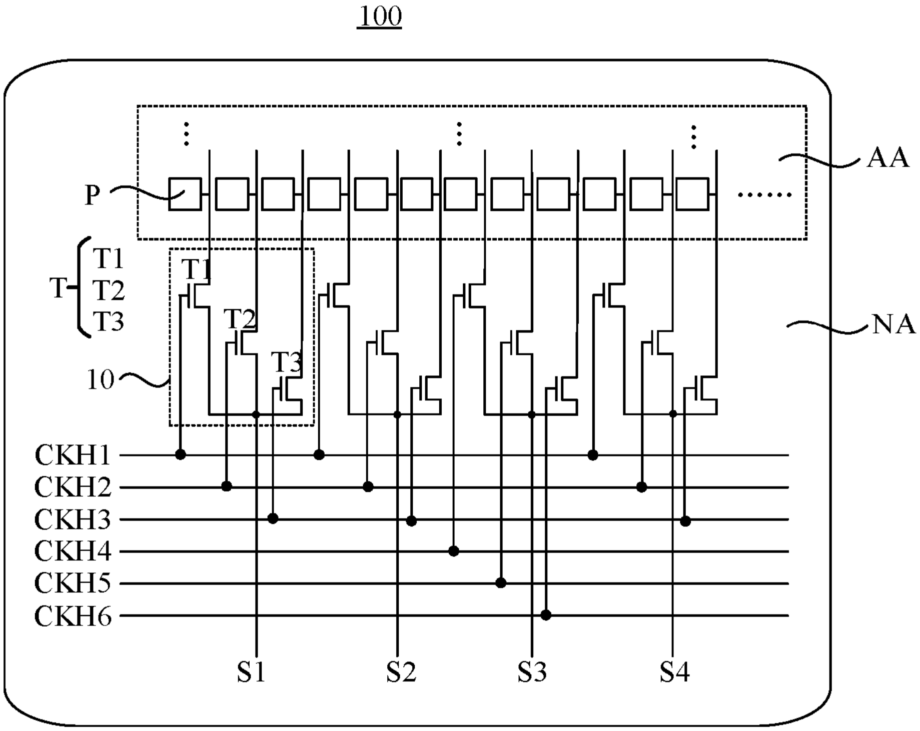
FIG. 8 is a partial structural diagram of another display panel according to an embodiment of the present disclosure.

K=2, k=1, M=6 and N=3 are used as an example. Referring to FIG. 4, the demultiplexer 10 includes three gating switches, which are T1, T2 and T3, respectively. For any one of the gating units 10, a control terminal of an i-th gating switch Ti is electrically connected to the i-th timing control line CKHi. For example, in a demultiplexer 10 electrically connected to a signal source line S1, a control terminal of a first gating switch T1 is electrically connected to the first timing control line CKH1, a control terminal of a second gating switch T2 is electrically connected to the second timing control line CKH2, and a control terminal of a third gating switch T3 is electrically connected to the third timing control line CKH3. Alternatively, in the demultiplexer 10 electrically connected to the signal source line S2, a control terminal of a first gating switch T1 is electrically connected to the fourth timing control line CKH4, a control terminal of a second gating switch T2 is electrically connected to the fifth timing control line CKH5, and a control terminal of a third gating switch T3 is electrically connected to the sixth timing control line CKH6. It is to be understood that the timing control lines CKH1 to CKH6 may be considered to be divided into two groups, where a first group of timing control lines CKH includes CKH1 to CKH3, and a second group of timing control lines CKH includes CKH4 to CKH6. The demultiplexer 10 may be electrically connected to the first group of timing control lines CKH, or may be electrically connected to the second group of timing control lines CKH. FIG. 4 is only an exemplary illustration. In other embodiments, a structure shown in FIG. 8 may also be used, which is not specifically limited here, and a specific connection manner may be set according to an actual requirement. In this manner, it is only necessary to ensure that when gating switches T controlled by at least one timing control line CKH are turned on, data signals transmitted by at least two signal source lines S electrically connected to at least two gating switches T controlled by the timing control line CKH have opposite voltage polarities, so as to ensure that coupling impacts of the data signals transmitted by the signal source lines S on an effective timing control signal Ckh transmitted by the timing control line CKH can be mutually canceled, thereby ensuring that the effective timing control signal Ckh transmitted by the timing control line CKH can be quickly maintained at a stable effective level (for example, a high level), avoiding the delayed charging of some sub-pixels P, ensuring the balanced charging of the sub-pixels P in the display region AA and improving the display effect of the display panel 100.

Figure 9:
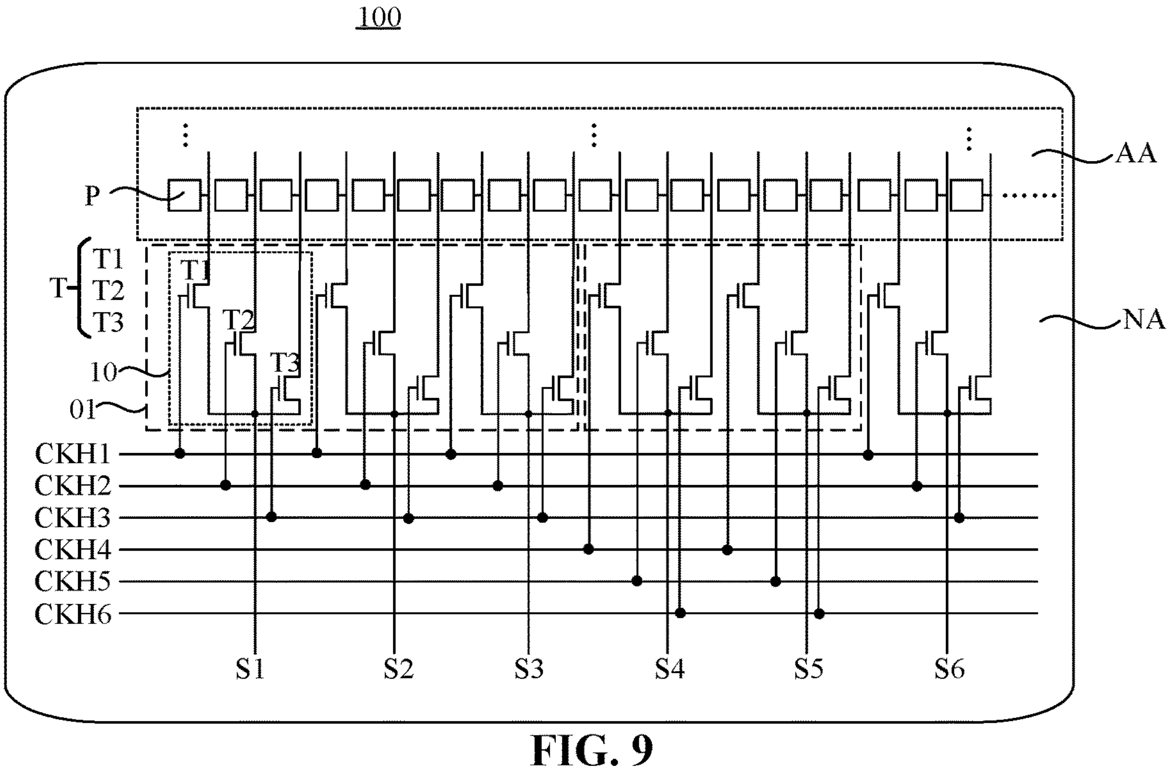
FIG. 9 is a partial structural diagram of another display panel according to an embodiment of the present disclosure.

In some embodiments, FIG. 9 is a partial structural diagram of another display panel according to an embodiment of the present disclosure. As shown in FIG. 9, a plurality of demultiplexers 10 are divided into a plurality of demultiplexer groups 01, and each of the plurality of demultiplexer groups 01 includes at least two adjacent demultiplexers 10; in the same demultiplexer group 01, a control terminal of an i-th gating switch Ti of each demultiplexer 10 is electrically connected to an i-th timing control line CKHi, or a control terminal of an i-th gating switch Ti of each demultiplexer is electrically connected to an (i+kN)-th timing control line CKH(i+kN).

For example, K=2, k=1, M=6 and N=3 are used as an example. Two demultiplexer groups 01 among the plurality of demultiplexer groups 01 are illustrated in FIG. 9. One demultiplexer group 01 includes three demultiplexers 10, which are electrically connected to signal source lines S1, S2 and S3, respectively. In each demultiplexer 10 in the demultiplexer group 01, a control terminal of a first gating switch T1 is electrically connected to a first timing control line CKH1, a control terminal of a second gating switch T2 is electrically connected to a second timing control line CKH2, and a control terminal of a third gating switch T3 is electrically connected to a third timing control line CKH3. The other demultiplexer group 01 includes two demultiplexers 10, which are electrically connected to signal source lines S4 and S5, respectively. In each demultiplexer 10 in the demultiplexer group 01, a control terminal of a first gating switch T1 is electrically connected to a fourth timing control line CKH4, a control terminal of a second gating switch T2 is electrically connected to a fifth timing control line CKH5, and a control terminal of a third gating switch T3 is electrically connected to a sixth timing control line CKH6. In this manner, since data signals transmitted by signal source lines S electrically connected to at least two adjacent demultiplexers 10 in each demultiplexer group 01 have opposite voltage polarities and the at least two demultiplexers 10 are electrically connected to the same timing control lines CKH, when gating switches T controlled by each timing control line CKH are turned on, data signals transmitted by at least two signal source lines S electrically connected to the gating switches T have opposite voltage polarities so that coupling impacts of the data signals transmitted by the signal source lines S on an effective timing control signal Ckh transmitted by the timing control line CKH can be mutually canceled, thereby ensuring the balanced charging of the sub-pixels P in a display region AA and improving a display effect of the display panel 100.

It is to be noted that the plurality of demultiplexers 10 may be divided into two or more demultiplexer groups 01, which is not specifically limited here and may be set according to an actual requirement.

Figure 10:
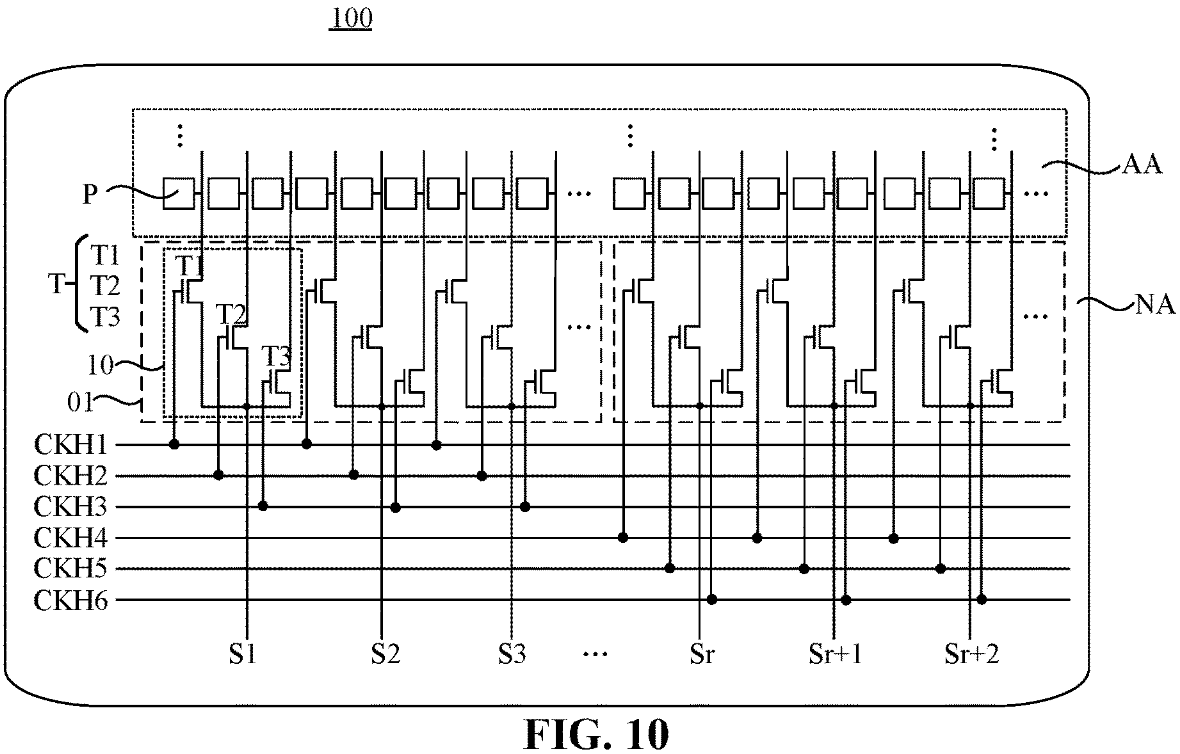
FIG. 10 is a partial structural diagram of another display panel according to an embodiment of the present disclosure.

A structural diagram where a plurality of demultiplexers 10 are divided into two demultiplexer groups 01 is illustrated in FIG. 10. Each demultiplexer group 01 includes a plurality of demultiplexers 10, where each of the plurality of demultiplexers 10 is electrically connected to one signal source line S (for example, S1, S2, S3, . . . , Sr, Sr+1, Sr+2, . . . ). With continued reference to FIG. 10, in one demultiplexer group 01, a control terminal of an i-th gating switch Ti of each demultiplexer 10 is electrically connected to an i-th timing control line CKHi, that is, in the each demultiplexer 10 in the demultiplexer group 01, a control terminal of a first gating switch T1 is electrically connected to a first timing control line CKH1, a control terminal of a second gating switch T2 is electrically connected to a second timing control line CKH2, and a control terminal of a third gating switch T3 is electrically connected to a third timing control line CKH3. In the other demultiplexer group 01, a control terminal of an i-th gating switch Ti of each demultiplexer is electrically connected to an (i+kN)-th timing control line CKH(i+kN), that is, in the each demultiplexer 10 in the demultiplexer group 01, a control terminal of a first gating switch T1 is electrically connected to a fourth timing control line CKH4, a control terminal of a second gating switch T2 is electrically connected to a fifth timing control line CKH5, and a control terminal of a third gating switch T3 is electrically connected to a sixth timing control line CKH6.

In addition, the number of demultiplexers 10 in the each demultiplexer group 01 may be the same or different, which is not specifically limited in the present disclosure and may be set according to an actual requirement.

Figure 11:
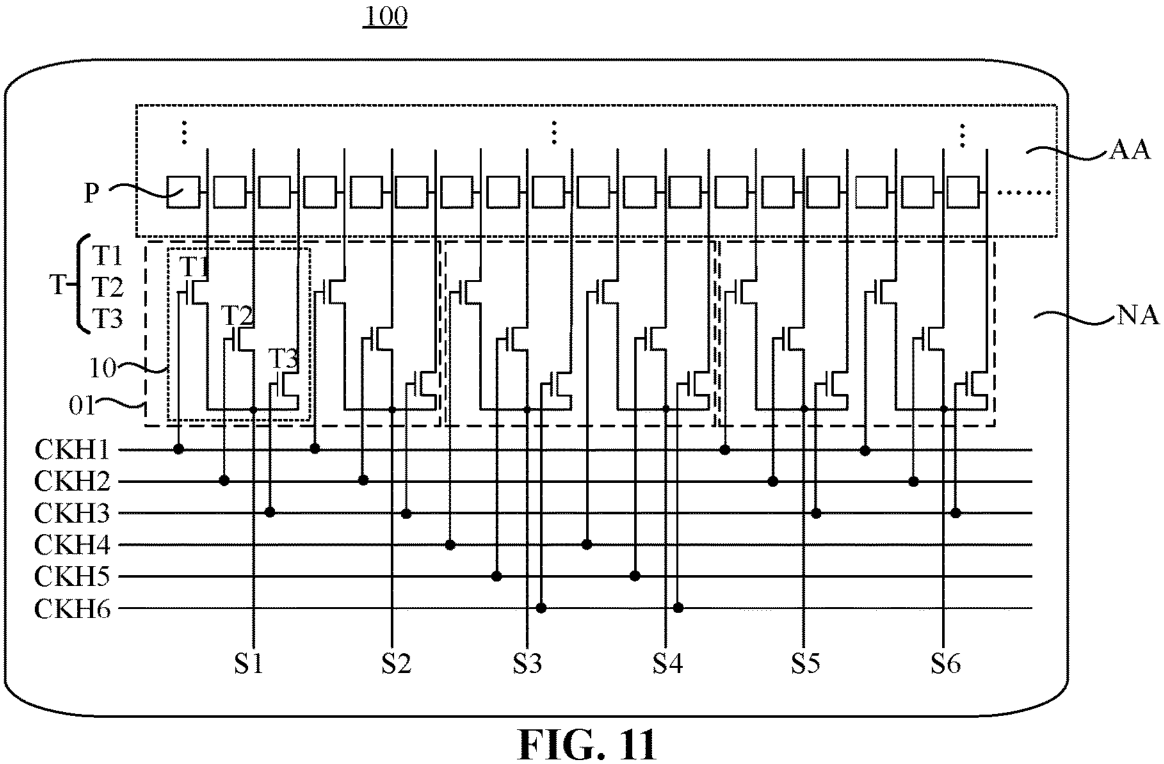
FIG. 11 is a partial structural diagram of another display panel according to an embodiment of the present disclosure.

In an optional embodiment, FIG. 11 is a partial structural diagram of another display panel according to an embodiment of the present disclosure. As shown in FIG. 11, all demultiplexer groups 01 have the same number of demultiplexers 10, and for any two adjacent demultiplexer groups 01, a control terminal of an i-th gating switch Ti of each demultiplexer 10 in one demultiplexer group 01 is electrically connected to an i-th timing control line CKHi, and a control terminal of an i-th gating switch Ti of each demultiplexer 10 in the other demultiplexer group 01 is electrically connected to an (i+kN)-th timing control line CKH(i+kN).

For example, K=2, k=1, M=6 and N=3 are used as an example. A structural diagram where all the demultiplexer groups 01 have the same number of demultiplexers 10 and each demultiplexer group 01 has two demultiplexers 10 is illustrated in FIG. 11. For any two adjacent demultiplexer groups 01, the control terminal of the i-th gating switch Ti of each demultiplexer 10 in one demultiplexer group 01 is electrically connected to the i-th timing control line CKHi, that is, in the demultiplexer 10, a control terminal of a first gating switch T1 is electrically connected to a first timing control line CKH1, a control terminal of a second gating switch T2 is electrically connected to a second timing control line CKH2, and a control terminal of a third gating switch T3 is electrically connected to a third timing control line CKH3. The control terminal of the i-th gating switch Ti of each demultiplexer 10 in the other demultiplexer group 01 is electrically connected to the (i+kN)-th timing control line CKH(i+kN), that is, in the demultiplexer 10, a control terminal of a first gating switch T1 is electrically connected to a fourth timing control line CKH4, a control terminal of a second gating switch T2 is electrically connected to a fifth timing control line CKH5, and a control terminal of a third gating switch T3 is electrically connected to a sixth timing control line CKH6. In this manner, all the demultiplexer groups 01 have the same number of demultiplexers 10 so that all the demultiplexer groups 01 are electrically connected the same number of signal source lines S and coupling impacts of all the demultiplexer groups 01 on timing control signals Ckh are consistent. Further, any two adjacent demultiplexer groups 01 are electrically connected to different timing control lines CKH, that is, the demultiplexer groups 01 are electrically connected to two groups of different timing control lines CKH (a first group of timing control lines includes CKH1 to CKH3, and a second group of timing control lines includes CKH4 to CKH6) alternately. In the case where both the groups of timing control lines CKH are electrically connected to the same number of demultiplexer groups 01, it can be ensured that the timing control lines CKH in the first group of timing control lines and the second group of timing control lines are electrically connected to the same number of gating switches T, thereby avoiding the imbalanced charging of sub-pixels P caused by inconsistent loads of the different timing control lines CKH, ensuring more balanced charging of the sub-pixels P, improving the display uniformity of the display panel 100 and improving the display quality.

Figure 12:
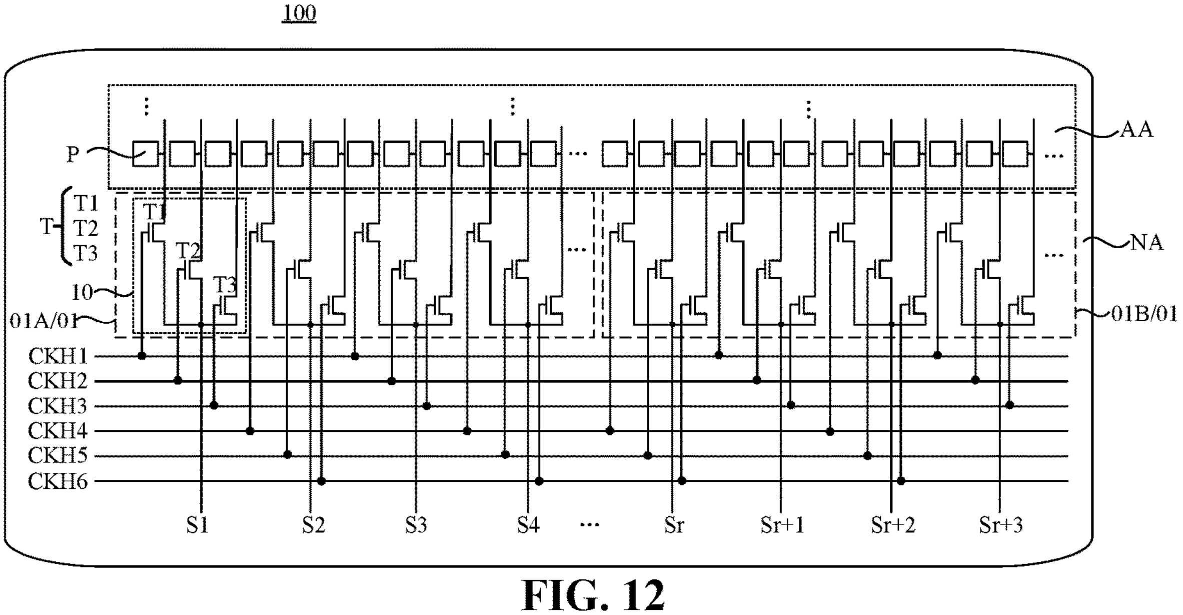
FIG. 12 is a partial structural diagram of another display panel according to an embodiment of the present disclosure.

In some embodiments, FIG. 12 is a partial structural diagram of another display panel according to an embodiment of the present disclosure. As shown in FIG. 12, a plurality of demultiplexers 10 are divided into two demultiplexer groups 01, which are a first demultiplexer group 01A and a second demultiplexer group 01B, respectively; in the first demultiplexer group 01A, a control terminal of an i-th gating switch Ti of each demultiplexer 10 at an odd-numbered position is electrically connected to an i-th timing control line CKHi, and a control terminal of an i-th gating switch Ti of each demultiplexer 10 at an even-numbered position is electrically connected to an (i+kN)-th timing control line CKH(i+kN); in the second demultiplexer group 01B, a control terminal of an i-th gating switch Ti of each demultiplexer 10 at an even-numbered position is electrically connected to the i-th timing control line CKHi, and a control terminal of an i-th gating switch Ti of each demultiplexer 10 at an odd-numbered position is electrically connected to the (i+kN)-th timing control line CKH(i+kN).

For example, K=2, k=1, M=6 and N=3 are used as an example. A structural diagram of the first demultiplexer group 01A and the second demultiplexer group 01B is illustrated in FIG. 12. In the first demultiplexer group 01A, in the each demultiplexer 10 at the odd-numbered position, a control terminal of a first gating switch T1 is electrically connected to a first timing control line CKH1, a control terminal of a second gating switch T2 is electrically connected to a second timing control line CKH2, and a control terminal of a third gating switch T3 is electrically connected to a third timing control line CKH3; in the each demultiplexer 10 at the even-numbered position, a control terminal of a first gating switch T1 is electrically connected to a fourth timing control line CKH4, a control terminal of a second gating switch T2 is electrically connected to a fifth timing control line CKH5, and a control terminal of a third gating switch T3 is electrically connected to a sixth timing control line CKH6. In the second demultiplexer group 01B, in the each demultiplexer 10 at the even-numbered position, a control terminal of a first gating switch T1 is electrically connected to the first timing control line CKH1, a control terminal of a second gating switch T2 is electrically connected to the second timing control line CKH2, and a control terminal of a third gating switch T3 is electrically connected to the third timing control line CKH3; in the each demultiplexer 10 at the odd-numbered position, a control terminal of a first gating switch T1 is electrically connected to the fourth timing control line CKH4, a control terminal of a second gating switch T2 is electrically connected to the fifth timing control line CKH5, and a control terminal of a third gating switch T3 is electrically connected to the sixth timing control line CKH6. In this manner, for any one of the timing control lines CKH1 to CKH3, voltage polarities of data signals transmitted by signal source lines S (S1, S3, S5, . . . ) electrically connected to gating switches T located in the first demultiplexer group 01A controlled to turn on by the timing control line CKH are all positive, and voltage polarities of data signals transmitted by signal source lines S (Sr+1, Sr+3, Sr+5, . . . ) electrically connected to gating switches T located in the second demultiplexer group 01B controlled to turn on by the timing control line CKH are all negative, so that when the gating switches T controlled by any one of the timing control lines CKH1 to CKH3 are turned on, the data signals transmitted by the corresponding signal source lines S include both positive polarity signals and negative polarity signals, thereby reducing a coupling impact on a timing control signal Ckh. Similarly, for any one of the timing control lines CKH4 to CKH6, voltage polarities of data signals transmitted by signal source lines S (S2, S4, S6, . . . ) electrically connected to gating switches T located in the first demultiplexer group 01A controlled to turn on by the timing control line CKH are all negative, and voltage polarities of data signals transmitted by signal source lines S (Sr, Sr+2, Sr+4, . . . ) electrically connected to gating switches T located in the second demultiplexer group 01B controlled to turn on by the timing control line CKH are all positive, so that when the gating switches T controlled by any one of the timing control lines CKH4 to CKH6 are turned on, the data signals transmitted by the corresponding signal source lines S include both positive polarity signals and negative polarity signals, thereby reducing a coupling impact on a timing control signal Ckh, ensuring the balanced charging of the sub-pixels P in a display region AA and improving a display effect of the display panel 100.

In some embodiments, with continued reference to FIGS. 10 to 12, in each demultiplexer group 01, the number of demultiplexers 10 is an even number so that in the each demultiplexer group 01, half of the demultiplexers 10 are electrically connected to signal source lines S transmitting positive polarity data signals and the other half of the demultiplexers 10 are electrically connected to signal source lines S transmitting negative polarity data signals, that is, the number of signal source lines S transmitting the positive polarity data signals is the same as the number of signal source lines S transmitting the negative polarity data signals. Therefore, coupling impacts of all the demultiplexer groups 01 on an effective timing control signal Ckh transmitted by the same timing control line CKH are completely canceled, and an effective timing control signal Ckh transmitted by each timing control line CKH is not affected by data signals transmitted by signal source lines S, so that the charging of the sub-pixels P is more balanced, thereby improving the display effect of the display panel 100.

On the basis of any one of the preceding embodiments, in some embodiments, for one of the M timing control lines CKH, when X gating switches T controlled by the one of the M timing control lines are turned on, the number of positive polarity data signals transmitted by x1 signal source lines S is the same as the number of negative polarity data signals transmitted by x1 signal source lines S, where x1=X/2, and each of X and x1 is an integer greater than 1. In this manner, when each timing control line CKH controls gating switches T to turn on, coupling impacts of data signals transmitted by signal source lines S electrically connected to the gating switches T controlled by the timing control line CKH on a timing control signal Ckh can be completely canceled, and it is ensured that an effective timing control signal Ckh transmitted by any one of the timing control lines CKH is not affected by data signals transmitted by signal source lines S, so that the charging of the sub-pixels P is more balanced, thereby improving the display effect of the display panel 100.

In some embodiments, with continued reference to FIGS. 4 to 12, all the M timing control lines CKH control the same number of gating switches T to turn on. In this manner, loads of the timing control lines CKH can be made consistent, so as to avoid the imbalanced charging of the sub-pixels P caused by inconsistent loads, thereby ensuring that the charging of the sub-pixels P is more balanced, improving the display uniformity of the display panel 100 and improving the display quality.

It is to be noted that the number of gating switches T controlled to turn on by each timing control line CKH may be any value, which is not specifically limited in the embodiment of the present disclosure and may be set according to an actual requirement.

Figure 13:
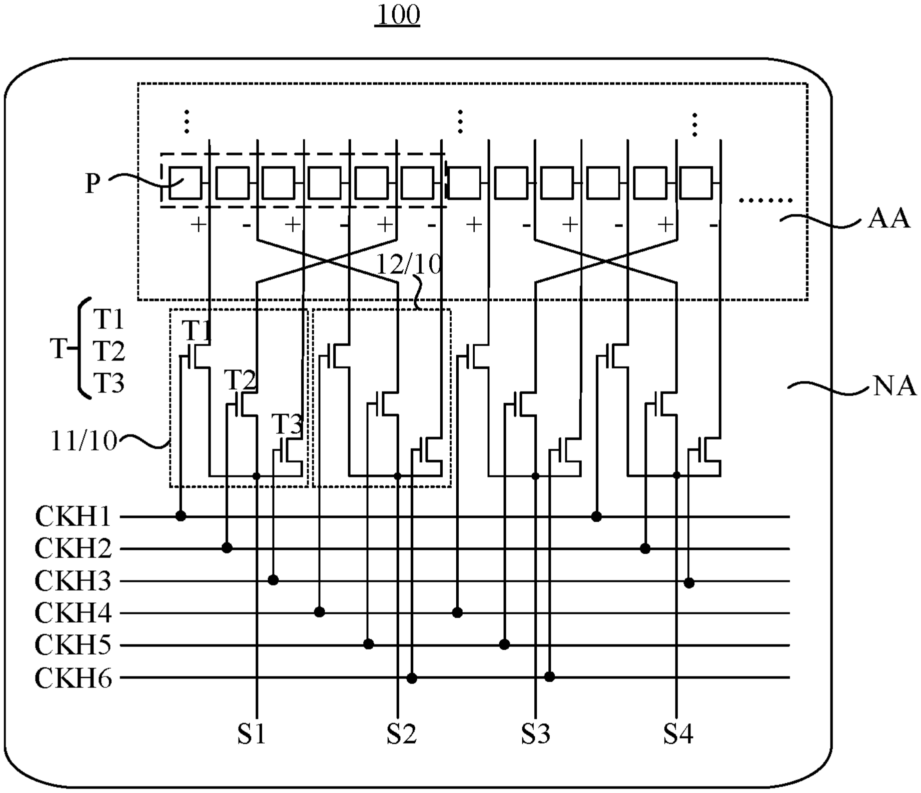
FIG. 13 is a partial structural diagram of another display panel according to an embodiment of the present disclosure.

In some embodiments, FIG. 13 is a partial structural diagram of another display panel according to an embodiment of the present disclosure. As shown in FIG. 13, a plurality of sub-pixels P arranged in an array include 2N adjacent columns of sub-pixels P, where data signals received by two adjacent columns of sub-pixels P have opposite voltage polarities; a plurality of demultiplexers 10 include a first demultiplexer 11 and a second demultiplexer 12 which are adjacent to each other, where the first demultiplexer 11 is electrically connected to sub-pixels P receiving a positive polarity data signal, where the sub-pixels P are among the 2N columns of sub-pixels P, and the second demultiplexer 12 is electrically connected to sub-pixels P receiving a negative polarity data signal, where the sub-pixels P are among the 2N columns of sub-pixels P.

K=2, k=1, M=6 and N=3 are used as an example. A structural diagram of six adjacent columns of sub-pixels P (for example, a first column of sub-pixels P to a sixth column of sub-pixels P corresponding to a dashed-line box in FIG. 13) is illustrated in FIG. 13. Data signals received by two adjacent columns of sub-pixels P have opposite voltage polarities, where a voltage polarity of a data signal received by an odd-numbered column of sub-pixels P is positive (denoted by +), and a voltage polarity of a data signal received by an even-numbered column of sub-pixels P is negative (denoted by −). It is to be understood that when the display panel 100 is a liquid crystal display panel, signal source lines S of two adjacent frames of display images generally provide opposite data signals. In this manner, a direction of an electric field where a liquid crystal can be controlled to rotate will be reversed. The data signals received by the two adjacent columns of sub-pixels P have the opposite voltage polarities, thereby preventing the polarization of the liquid crystal which causes the problems such as afterimage.

Further, the first demultiplexer 11 is electrically connected to sub-pixels P receiving a positive polarity data signal, where the sub-pixels P are among the first column of sub-pixels P to the sixth column of sub-pixels P, that is, the first demultiplexer 11 is electrically connected to odd-numbered columns of sub-pixels P among the first column of sub-pixels P to the sixth column of sub-pixels P, and the second demultiplexer 12 is electrically connected to sub-pixels P receiving a negative polarity data signal, where the sub-pixels P are among the first column of sub-pixels P to the sixth column of sub-pixels P, that is, the second demultiplexer 12 is electrically connected to even-numbered columns of sub-pixels P among the first column of sub-pixels P to the sixth column of sub-pixels P. In this manner, the six adjacent columns of sub-pixels P are electrically connected to two nearest demultiplexers 10, thereby reducing lengths of wires electrically connecting the demultiplexers 10 to data lines and saving wiring space, which is conducive to a design of a narrow bezel of the display panel 100. Moreover, the number of mutual intersections of the wires is reduced, thereby reducing the difficulty of performing a bridge process due to the intersections of the wires.

Figure 14:
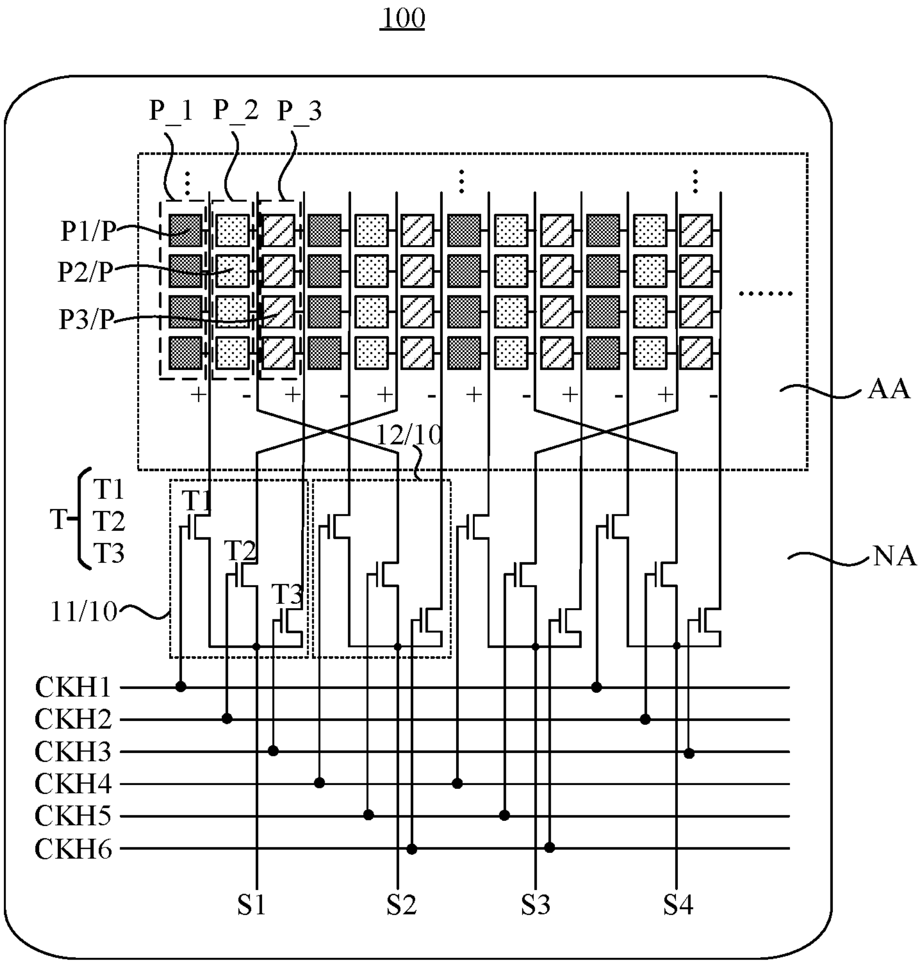
FIG. 14 is a partial structural diagram of another display panel according to an embodiment of the present disclosure.

In some embodiments, FIG. 14 is a partial structural diagram of another display panel according to an embodiment of the present disclosure. As shown in FIG. 14, a plurality of sub-pixels P arranged in an array include a first sub-pixel column P_1, a second sub-pixel column P_2 and a third sub-pixel column P_3, where the first sub-pixel column P_1 includes a first sub-pixel P1, the second sub-pixel column P_2 includes a second sub-pixel P2, and the third sub-pixel column P_3 includes a third sub-pixel P3, where emitted colors of the first sub-pixel P1, the second sub-pixel P2 and the third sub-pixel P3 are different from each other; M timing control lines CKH include a first type of timing control line CKH_1, a second type of timing control line CKH_2 and a third type of timing control line CKH_3, where an output terminal of a gating switch T electrically connected to the first type of timing control line CKH_1 is electrically connected to the first sub-pixel column P_1, an output terminal of a gating switch T electrically connected to the second type of timing control line CKH_2 is electrically connected to the second sub-pixel column P_2, and an output terminal of a gating switch T electrically connected to the third type of timing control line CKH_3 is electrically connected to the third sub-pixel column P_3.

The first sub-pixel P1, the second sub-pixel P2 and the third sub-pixel P3 may be sub-pixels having any emitted color, which is not specifically limited in the embodiment of the present disclosure. For example, the first sub-pixel P1 is a red sub-pixel, the second sub-pixel P2 is a green sub-pixel, and the third sub-pixel P3 is a blue sub-pixel.

K=2, k=1, M=6 and N=3 are used as an example. A structural diagram of the plurality of sub-pixels P arranged in the array is illustrated in FIG. 14. All columns of sub-pixels P may have the same emitted color or different emitted colors, which is not specifically limited in the embodiment of the present disclosure. Only the case where sub-pixels P in the same column have the same emitted color is exemplarily illustrated in FIG. 14, but it is not limited thereto. With continued reference to FIG. 14, it is to be understood that the same type of timing control line CKH refers to timing control lines CKH having the same timing control signal, that is, the first type of timing control line CKH_1 may include a first timing control line CKH1 and a fourth timing control line CKH4, the second type of timing control line CKH_2 may include a second timing control line CKH2 and a fifth timing control line CKH5, and the third type of timing control line CKH_3 may include a third timing control line CKH3 and a sixth timing control line CKH6.

With continued reference to FIG. 14, the output terminal of the gating switch T electrically connected to the first type of timing control line CKH_1 is electrically connected to the first sub-pixel column P_1, that is, when the first timing control line CKH1 or the fourth timing control line CKH4 controls a corresponding gating switch T to turn on, the first sub-pixel column P_1 can receive a data signal for charging. The output terminal of the gating switch T electrically connected to the second type of timing control line CKH_2 is electrically connected to the second sub-pixel column P_2, that is, when the second timing control line CKH2 or the fifth timing control line CKH5 controls a corresponding gating switch T to turn on, the second sub-pixel column P_2 can receive a data signal for charging. The output terminal of the gating switch T electrically connected to the third type of timing control line CKH_3 is electrically connected to the third sub-pixel column P_3, that is, when the third timing control line CKH3 or the sixth timing control line CKH6 controls a corresponding gating switch T to turn on, the third sub-pixel column P_3 can receive a data signal for charging. A specific manner of electrically connecting the same column of sub-pixels P to the same type of timing control line CKH through a gating switch T electrically connected to a data line includes, but is not limited to, a manner shown in FIG. 14, which may be set according to an actual requirement. In this manner, the same type of timing control line CKH is electrically connected to sub-pixel columns having the same emitted color, thereby ensuring the uniformity of the charging of sub-pixels P having the same emitted color and ensuring the display uniformity.

With continued reference to FIG. 14, further optionally, for the same type of timing control lines CKH (for example, CKH_1, CKH_2, or CKH_3), when each timing control line CKH of the same type timing control lines CKH controls gating switches T to turn on, data signals transmitted by signal source lines S, which are electrically connected to the gating switches T respectively, include at least one positive polarity data signal and at least one negative polarity data signal, where the number of the at least one positive polarity data signal is the same as the number of the at least one negative polarity data signal.

Since the same type of timing control line CKH transmits the same effective timing control signal Ckh and sub-pixels P electrically connected to corresponding controlled gating switches T have the same emitted color, when the each timing control line CKH among the same type of timing control line CKH controls the gating switches T to turn on, the data signals transmitted by the corresponding signal source lines S include the positive polarity data signal and the negative polarity data signal, where the number of positive polarity data signals is the same as the number of negative polarity data signals, so that the data signals transmitted by the signal source lines S have completely the same coupling impact on an effective timing control signal Ckh transmitted by the each timing control line CKH among the same type of timing control line CKH, and in the case where the number of positive polarity data signals is the same as the number of negative polarity data signals, coupling impacts of data signals having opposite voltage polarities on the timing control signal Ckh can be mutually canceled, thereby ensuring that the effective timing control signal Ckh transmitted by the timing control line CKH can be quickly maintained at a stable effective level (for example, a high level), ensuring the balanced charging of the sub-pixels P in the sub-pixel columns having the same emitted color and improving a display effect of the display panel 100.

Figure 15:
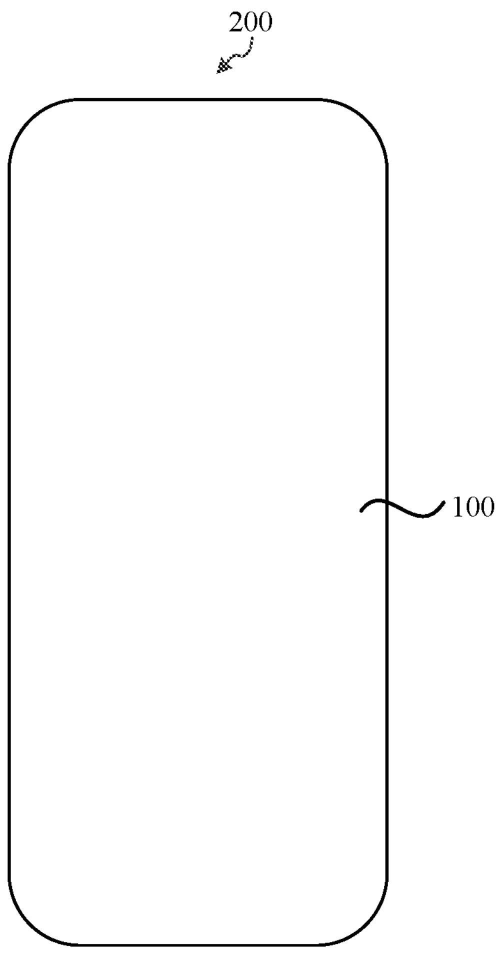
FIG. 15 is a structural diagram of a display device according to an embodiment of the present disclosure.

The embodiments of the present disclosure further provide a display device. FIG. 15 is a structural diagram of a display device according to an embodiment of the present disclosure. As shown in FIG. 15, the display device 200 includes the display panel 100 according to any one of the embodiments of the present disclosure. The display device 200 according to the embodiment of the present disclosure may be a mobile phone or any electronic product having a display function, including, but not limited to, the following categories such as a television, a notebook computer, a desktop display, a tablet computer, a digital camera, a smart bracelet, smart glasses, an in-vehicle display, medical equipment, industrial control equipment and a touch interactive terminal, which is not specially limited in the embodiment of the present disclosure.

It is to be noted that the preceding are preferred embodiments of the present disclosure and the technical principles used therein. It is to be understood by those skilled in the art that the present disclosure is not limited to the embodiments herein. For those skilled in the art, various apparent modifications, adaptations, combinations and substitutions can be made without departing from the scope of the present disclosure. Therefore, while the present disclosure has been described in detail through the preceding embodiments, the present disclosure is not limited to the preceding embodiments and may include equivalent embodiments without departing from the concept of the present disclosure. The scope of the present disclosure is determined by the scope of the appended claims.

What is claimed is:

1. A display panel, comprising: a display region and a non-display region located on one side of the display region, wherein the display region comprises a plurality of sub-pixels arranged in an array, and the non-display region comprises a plurality of demultiplexers, a plurality of signal source lines and M timing control lines, wherein M is an integer greater than 1;

wherein each of the plurality of demultiplexers comprises N gating switches, in a same demultiplexer, input terminals of the N gating switches are electrically connected to a same signal source line, an output terminal of each of the plurality of gating switches is electrically connected to one column of sub-pixels of the plurality of sub-pixels, and control terminals of the plurality of gating switches are electrically connected to different timing control lines, wherein M=K*N, and each of K and N is an integer greater than 1; and at a display stage, N timing control lines electrically connected to the same demultiplexer are configured to output timing control signals in a time-division manner to control the N gating switches of the same demultiplexer to turn on according to the timing control signals, wherein, the M timing control lines comprise at least one first timing control line, when gating switches controlled by any one of the at least one first timing control line are turned on, data signals transmitted by at least two signal source lines electrically connected to at least two gating switches of the gating switches controlled by any one of the at least one first timing control line have opposite voltage polarities.

2. The display panel according to claim 1, wherein an i-th timing control line and any (i+kN)-th timing control line have a same timing control signal, wherein 1≤i≤N, 1≤k<K, and k is an integer.

3. The display panel according to claim 2, wherein data signals transmitted by two signal source lines electrically connected to any two adjacent demultiplexers have opposite voltage polarities; and the plurality of demultiplexers comprise two adjacent demultiplexers, and among N timing control lines electrically connected to one of the two adjacent demultiplexers, at least one timing control line is electrically connected to the other one of the two adjacent demultiplexers.

4. The display panel according to claim 3, wherein the N gating switches of each of the plurality of demultiplexers are divided into a first gating switch to an N-th gating switch; and for any one of the plurality of demultiplexers, a control terminal of an i-th gating switch is electrically connected to the i-th timing control line, or a control terminal of an i-th gating switch is electrically connected to the (i+kN)-th timing control line.

5. The display panel according to claim 4, wherein the plurality of demultiplexers are divided into a plurality of demultiplexer groups, and each of the plurality of demultiplexer groups comprises at least two adjacent demultiplexers; and in a same demultiplexer group, a control terminal of an i-th gating switch of each demultiplexer is electrically connected to the i-th timing control line, or a control terminal of an i-th gating switch of each demultiplexer is electrically connected to the (i+kN)-th timing control line.

6. The display panel according to claim 5, wherein all the plurality of demultiplexer groups have a same number of demultiplexers, and for any two adjacent demultiplexer groups, a control terminal of an i-th gating switch of each demultiplexer in one demultiplexer group is electrically connected to the i-th timing control line, and a control terminal of an i-th gating switch of each demultiplexer in the other demultiplexer group is electrically connected to the (i+kN)-th timing control line.

7. The display panel according to claim 4, wherein the plurality of demultiplexers are divided into two demultiplexer groups, which are a first demultiplexer group and a second demultiplexer group, respectively;

in the first demultiplexer group, a control terminal of an i-th gating switch of each demultiplexer at an odd-numbered position is electrically connected to the i-th timing control line, and a control terminal of an i-th gating switch of each demultiplexer at an even-numbered position is electrically connected to the (i+kN)-th timing control line; and in the second demultiplexer group, a control terminal of an i-th gating switch of each demultiplexer at an even-numbered position is electrically connected to the i-th timing control line, and a control terminal of an i-th gating switch of each demultiplexer at an odd-numbered position is electrically connected to the (i+kN)-th timing control line.

8. The display panel according to claim 5, wherein in each of the demultiplexer groups, a number of demultiplexers is an even number.

9. The display panel according to claim 1, wherein for one of the M timing control lines, when X gating switches controlled by the one of the M timing control lines are turned on, a number of positive polarity data signals transmitted by x1 signal source lines is the same as a number of negative polarity data signals transmitted by x1 signal source lines, wherein x1=X/2, and each of X and x1 is an integer greater than 1.

10. The display panel according to claim 1, wherein all the M timing control lines control a same number of gating switches.

11. The display panel according to claim 1, wherein a gating switch of the N gating switches comprises an N-channel thin film transistor.

12. The display panel according to claim 1, wherein the plurality of sub-pixels arranged in the array comprise 2N adjacent columns of sub-pixels, wherein data signals received by two adjacent columns of sub-pixels of the 2N adjacent columns of sub-pixels have opposite voltage polarities; and the plurality of demultiplexers comprise a first demultiplexer and a second demultiplexer which are adjacent to each other, wherein the first demultiplexer is electrically connected to sub-pixels receiving a positive polarity data signal, wherein the sub-pixels receiving the positive polarity data signal are among the 2N columns of sub-pixels, and the second demultiplexer is electrically connected to sub-pixels receiving a negative polarity data signal, wherein the sub-pixels receiving the negative polarity data signal are among the 2N columns of sub-pixels.

13. The display panel according to claim 1, wherein the plurality of sub-pixels arranged in the array comprise a first sub-pixel column, a second sub-pixel column and a third sub-pixel column, wherein the first sub-pixel column comprises a first sub-pixel, the second sub-pixel column comprises a second sub-pixel, and the third sub-pixel column comprises a third sub-pixel, wherein emitted colors of the first sub-pixel, the second sub-pixel and the third sub-pixel are different from each other; and the M timing control lines comprise a first type of timing control line, a second type of timing control line and a third type of timing control line, wherein an output terminal of a gating switch electrically connected to the first type of timing control line is electrically connected to the first sub-pixel column, an output terminal of a gating switch electrically connected to the second type of timing control line is electrically connected to the second sub-pixel column, and an output terminal of a gating switch electrically connected to the third type of timing control line is electrically connected to the third sub-pixel column.

14. The display panel according to claim 13, wherein for same type of timing control lines, when gating switches controlled by each timing control line of the same type of timing control lines are turned on, data signals transmitted by signal source lines, which are electrically connected to the gating switches controlled by the each timing control line of the same type of timing control lines, comprise at least one positive polarity data signal and at least one negative polarity data signal, wherein a number of the at least one positive polarity data signal is the same as a number of the at least one negative polarity data signal.

15. The display panel according to claim 1, wherein N=2, 3, or 6.

16. The display panel according to claim 7, wherein in each of the demultiplexer groups, a number of demultiplexers is an even number.

17. A display device, comprising: a display panel;

wherein the display panel comprises a display region and a non-display region located on one side of the display region, wherein the display region comprises a plurality of sub-pixels arranged in an array, and the non-display region comprises a plurality of demultiplexers, a plurality of signal source lines and M timing control lines, wherein M is an integer greater than 1;

wherein each of the plurality of demultiplexers comprises N gating switches, in a same demultiplexer, input terminals of the N gating switches are electrically connected to a same signal source line, an output terminal of each of the plurality of gating switches is electrically connected to one column of sub-pixels of the plurality of sub-pixels, and control terminals of the plurality of gating switches are electrically connected to different timing control lines, wherein M=K*N, and each of K and N is an integer greater than 1; and at a display stage, N timing control lines electrically connected to the same demultiplexer are configured to output timing control signals in a time-division manner to control the N gating switches of the same demultiplexer to turn on according to the timing control signals, wherein, the M timing control lines comprise at least one first timing control line, when gating switches controlled by any one of the at least one first timing control line are turned on, data signals transmitted by at least two signal source lines electrically connected to at least two gating switches of the gating switches controlled by any one of the at least one first timing control line have opposite voltage polarities.

18. The display device according to claim 17, wherein an i-th timing control line and an (i+kN)-th timing control line have a same timing control signal, wherein $1 \leq i \leq N$, $1 \leq k < K$, and k is an integer.

19. The display device according to claim 18, wherein data signals transmitted by two signal source lines electrically connected to any two adjacent demultiplexers have opposite voltage polarities; and the plurality of demultiplexers comprise two adjacent demultiplexers, and among N timing control lines electrically connected to one of the two adjacent demultiplexers, at least one timing control line is electrically connected to the other one of the two adjacent demultiplexers.

20. The display device according to claim 19, wherein the N gating switches of each of the plurality of demultiplexers are divided into a first gating switch to an N-th gating switch; and for any one of the plurality of demultiplexers, a control terminal of an i-th gating switch is electrically connected to the i-th timing control line, or a control terminal of an i-th gating switch is electrically connected to the (i+kN)-th timing control line.

* * * * *